(12) United States Patent
Mauer et al.

(10) Patent No.: US 9,319,407 B1
(45) Date of Patent: Apr. 19, 2016

(54) AUTHENTICATION EXTENSION TO UNTRUSTED DEVICES ON AN UNTRUSTED NETWORK

(71) Applicant: Sprint Communications Company L.P., Overland Park, KS (US)

(72) Inventors: Brian Mauer, Shawnee, KS (US); Richard Morton, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 42 days.

(21) Appl. No.: 14/256,102

(22) Filed: Apr. 18, 2014

(51) Int. Cl.
*H04L 29/06* (2006.01)
*H04L 9/32* (2006.01)

(52) U.S. Cl.
CPC .............. *H04L 63/0884* (2013.01); *H04L 9/32* (2013.01); *H04L 63/108* (2013.01)

(58) Field of Classification Search
CPC . H04L 63/0884; H04L 63/108; H04L 9/3297; H04L 9/32; H04L 9/3228; H04L 63/0876; H04W 12/06
See application file for complete search history.

(56) References Cited

U.S. PATENT DOCUMENTS

| | | | |
|---|---|---|---|
| 6,742,126 B1 | 5/2004 | Mann et al. | |
| 8,156,197 B1 * | 4/2012 | Livingston | G06F 21/6218 709/217 |
| 8,392,578 B1 * | 3/2013 | Donovan | H04L 67/325 709/227 |
| 8,489,072 B1 | 7/2013 | Ding | |
| 8,621,590 B2 * | 12/2013 | Hoggan | H04W 12/06 726/8 |
| 8,754,765 B2 | 6/2014 | Berger et al. | |
| 8,874,899 B1 | 10/2014 | Persson et al. | |
| 8,955,078 B2 * | 2/2015 | Hoggan | H04L 9/3263 380/200 |
| 9,154,949 B1 | 10/2015 | Bertz et al. | |
| 9,154,955 B1 | 10/2015 | Bertz et al. | |
| 2002/0184235 A1 | 12/2002 | Young et al. | |
| 2006/0171390 A1 | 8/2006 | La Joie | |
| 2006/0230279 A1 * | 10/2006 | Morris | H04L 63/1433 713/182 |
| 2006/0272031 A1 * | 11/2006 | Ache | G06F 21/10 726/28 |
| 2007/0120965 A1 | 5/2007 | Sandberg et al. | |
| 2007/0136205 A1 | 6/2007 | Przybilla | |
| 2008/0109307 A1 | 5/2008 | Ullah | |

(Continued)

OTHER PUBLICATIONS

Schneier, Bruce, "Applied Cryptography", Second Edition, 1996, Chapter 2, 2.2-2.5, Wiley and Sons.

(Continued)

*Primary Examiner* — Ali Abyaneh
*Assistant Examiner* — Carlos M De Jesus Lassala

(57) ABSTRACT

A server for providing premium communication services via an untrusted network. The server comprises a processor, memory, and an application that is configured to receive a request from an untrusted communication device to access a premium communication service via the untrusted network, wherein the request comprises an internet protocol (IP) address, match the IP address from the request with a previously stored source IP address associated with a message sent by a trusted mobile communication device, wherein the device is authorized to access the premium communication service via the untrusted network, determine if the request is received within a time period indicated by a previously assigned time-to-live value associated with authentication extension, upon determining that the request is received within the indicated time period, generate a cookie associated with the communication device, and send the cookie to the communication device via the untrusted network.

19 Claims, 9 Drawing Sheets

(56) References Cited

U.S. PATENT DOCUMENTS

| | | | |
|---|---|---|---|
| 2008/0289025 | A1 | 11/2008 | Schneider |
| 2009/0249405 | A1 | 10/2009 | Karaoguz et al. |
| 2009/0249406 | A1 | 10/2009 | Gordon et al. |
| 2009/0249413 | A1 | 10/2009 | Karaoguz et al. |
| 2009/0249422 | A1 | 10/2009 | Chen et al. |
| 2009/0249424 | A1 | 10/2009 | Gordon et al. |
| 2009/0298514 | A1 | 12/2009 | Ullah |
| 2010/0172253 | A1 | 7/2010 | Morita |
| 2010/0235550 | A1 | 9/2010 | Bolton et al. |
| 2010/0284668 | A1 | 11/2010 | Knight |
| 2011/0003582 | A1 | 1/2011 | Park et al. |
| 2011/0030039 | A1* | 2/2011 | Bilange .................. H04L 63/08 726/5 |
| 2011/0119494 | A1* | 5/2011 | Huang .................... G06F 21/10 713/182 |
| 2012/0008769 | A1 | 1/2012 | Collins et al. |
| 2013/0097674 | A1* | 4/2013 | Jindal ..................... G06F 15/16 726/4 |
| 2013/0111211 | A1 | 5/2013 | Winslow et al. |
| 2014/0018040 | A1 | 1/2014 | Kim |
| 2014/0143137 | A1* | 5/2014 | Carlson .................. G06Q 20/02 705/39 |

OTHER PUBLICATIONS

Horn, et al., "Authentication Protocols for Mobile Network Environment Value-Added Services", Vehicular Technology, IEEE Transactions on (vol. 51, Issue 2), Mar. 2002, pp. 383-392, IEEE Xplore.

Suzuki, et al., "A System for End-to-End Authentication of Adaptive Multimedia Content", Communications and Multimedia Security IFIP—The International Federation for Information Processing vol. 175, 2005, pp. 237-249, Springer US.

Pre-Interview Communication dated May 7, 2013, U.S. Appl. No. 13/005,859, filed Jan. 13, 2011.

Final Office Action dated Oct. 28, 2013, U.S. Appl. No. 13/005,859, filed Jan. 13, 2011.

Advisory Action dated Mar. 5, 2014, U.S. Appl. No. 13/005,859, filed Jan. 13, 2011.

Notice of Allowance dated Jun. 24, 2014, U.S. Appl. No. 13/005,859, filed Jan. 13, 2011.

Pre-Interview Communication dated Mar. 23, 2015, U.S. Appl. No. 13/937,193, filed Jul. 9, 2013.

Pre-Interview Communication dated Mar. 20, 2015, U.S. Appl. No. 13/937,191, filed Jul. 9, 2013.

Bertz, Lyle T., et al., "Authenticated Delivery of Premium Communication Services to Trusted Devices Over an Untrusted Network", filed Jul. 9, 2013, U.S. Appl. No. 13/937,193.

Bertz, Lyle T., et al., "Authenticated Delivery of Premium Communication Services to Untrusted Devices Over an Untrusted Network", filed Jul. 9, 2013, U.S. Appl. No. 13/937,191.

Notice of Allowance dated Jun. 2, 2015, U.S. Appl. No. 13/937,193, filed Jul. 8, 2013.

Notice of Allowance dated Jun. 3, 2015, U.S. Appl. No. 13/937,191, filed Jul. 8, 2013.

* cited by examiner

AUTHENTICATION EXTENSION TO UNTRUSTED DEVICES ON AN UNTRUSTED NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication service providers provide a variety of services including voice communication, data communication, video communication, and others. Premium communication services may provide access to a variety of content including movies and streaming video as well as access to applications that may execute on server computers accessed by users over the communication network infrastructure. Premium communication services may be provided to subscribers who pay a subscription fee to access and/or use the premium communication services. A premium service provider may verify that a user has paid for the requested premium service before authorizing the user to consume the subject premium service. For example, a premium service provider may verify that the user has paid for streaming video service before providing the streaming video in response to the user's request.

SUMMARY

In an embodiment, a method of an authentication server providing premium communications services via an untrusted network is disclosed. The method comprises receiving a request from an untrusted communication device to access a premium communication service via the untrusted network, wherein the request comprises an internet protocol (IP) address, matching the internet protocol (IP) address from the request with a previously stored source internet protocol (IP) address associated with a message received earlier from a trusted mobile communication device, wherein the trusted mobile communication device is authorized to access the premium communication service via the untrusted network, determining if the request is received within a time period indicated by a previously assigned time-to-live value associated with authentication extension, upon determining that the request is received within the indicated time period, generating a cookie associated with the communication device, embedding a new time-to-live value associated with premium content access within the cookie, wherein the new time-to-live value indicates a window of time for which authentication of the communication device is valid, and sending the cookie to the communication device via the untrusted network.

In an embodiment, an authentication server for providing premium communication services via an untrusted network is disclosed. The authentication server comprises a processor, a memory, and an application stored in the memory. When executed by the processor, the application is configured to receive a request from an untrusted communication device to access a premium communication service via the untrusted network, wherein the request comprises an internet protocol (IP) address, match the internet protocol (IP) address from the request with a previously stored source internet protocol (IP) address associated with a message received earlier from a trusted mobile communication device, wherein the trusted mobile communication device is authorized to access the premium communication service via the untrusted network, determine if the request is received within a time period indicated by a previously assigned time-to-live value associated with authentication extension, upon determining that the request is received within the indicated time period, generate a cookie associated with the communication device, embed a new time-to-live value associated with premium content access within the cookie, wherein the new time-to-live value indicates a window of time for which authentication of the communication device is valid, and send the cookie to the communication device via the untrusted network.

In an embodiment, a method for extending authentication to an untrusted communication device to access premium communication services via an untrusted network is disclosed. The method comprises receiving an input from an input device of the communication device, wherein the input initiates authentication for access to a premium communication service via the untrusted network, transmitting via a router in the untrusted network to a session manager a request to receive a cookie from an authentication server, receiving a cookie from the session manager via the router in the untrusted network, building a request with the cookie, sending the request to the session manager via the router in the untrusted network to access the premium communication service, wherein the request is forwarded from the session manager to a premium communication service server, receiving content from the session manager via the router, wherein the content is obtained from the premium communication service server, and accessing the premium communication service.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
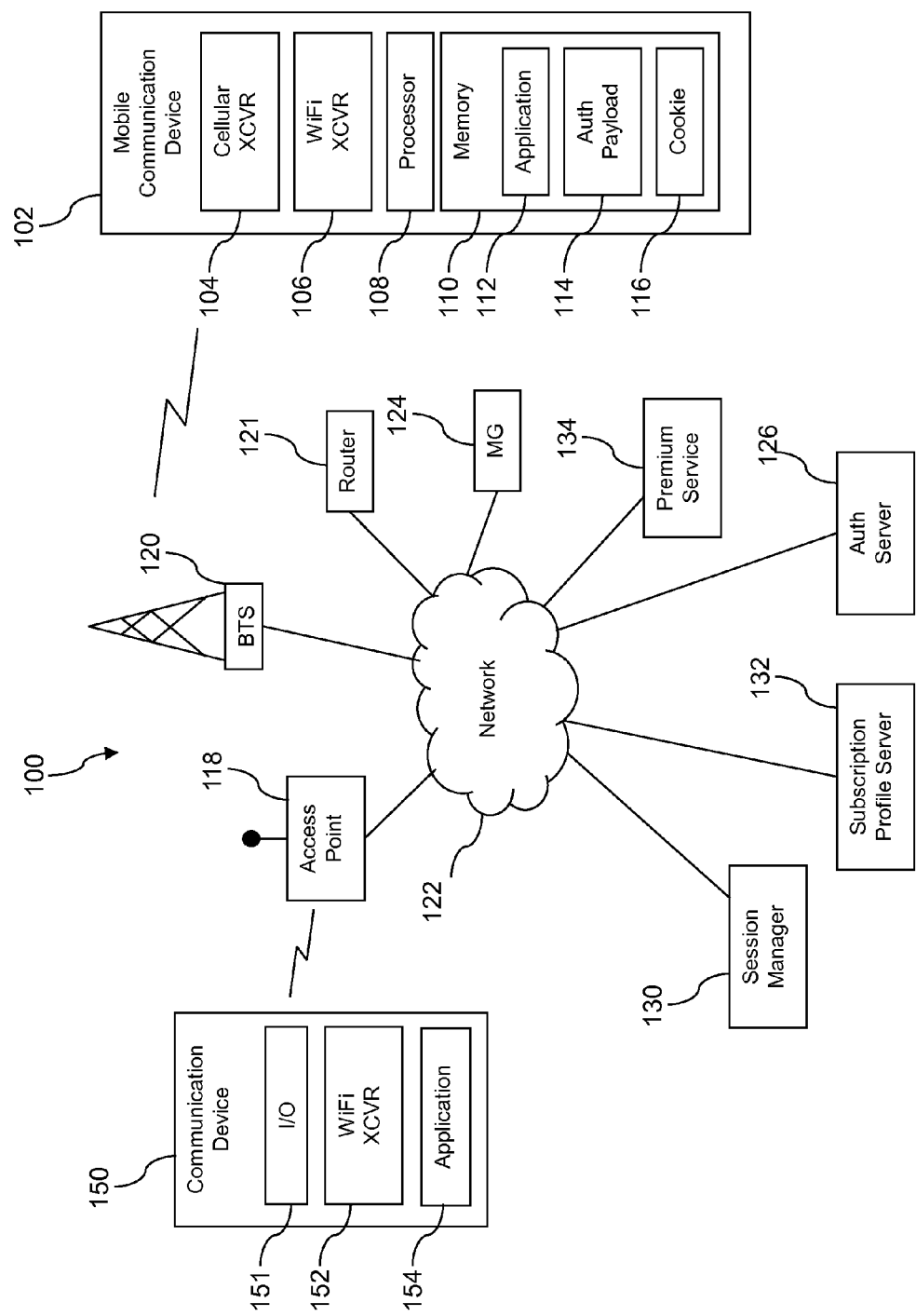
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Current implementations of authenticating premium communication services over an untrusted network may not be straightforward, particularly for untrusted communication devices. For example, a cellular wireless communication service subscriber may wish to consume premium communication services that are provisioned to a mobile communication device using a non-cellular communication device instead. A user may be prompted to submit an authentication request, receive a time-sensitive cookie and/or a security code, and manually enter the security code into an untrusted communication device in order to achieve authentication of the device. This conventional process, which involves a direct user input, may be difficult for communication devices that lack an accessible keyboard and/or a flexible user interface, such as televisions and network appliances. Therefore, disclosed herein are systems and methods for extending authentication and/or authorizing delivery of premium communication services to one or more untrusted communication devices over an untrusted network.

The present disclosure teaches leveraging a trusted mobile communication device to extend authentication to one or more untrusted communication devices in a simplified user friendly manner. The one or more untrusted communication devices may each receive an input signal and send a request to an authentication server via a router, wherein the router may allow the trusted mobile communication device and the one or more untrusted communication devices to connect to an untrusted network. The router may be a router in a private residence and may serve to connect a variety of private communication devices to a public network. The authentication server may check whether or not the request was received within a period of time indicated by a previously assigned time-to-live value associated with authentication extension. The authentication server may then determine that each device is related to the trusted mobile communication device by recognizing a source internet protocol (IP) address associated with the router After checking the time-to-live value associated with authentication extension and verifying the request with a cellular wireless communication subscriber associated with the trusted mobile communication device, the authentication of the trusted mobile communication device may be extended to the one or more untrusted communication devices. In an embodiment, a trusted mobile communication device may be a smartphone that is subscribed to receive cellular wireless communication service and already authorized to access premium communication services over an untrusted network. Authorization may initially be accomplished in the mobile communication device by sending an authentication request to receive a cookie and a proxy authentication header from an authentication server over an untrusted network. The mobile communication device may subsequently send a request to a premium communication service server to access premium content over the untrusted network by employing the obtained cookie for authentication. In an embodiment, the mobile communication device may receive two time-to-live values along with the cookie and proxy authentication header from the authentication server A first time-to-live value may be associated with premium content access and may be used to restrict the length of time over which the mobile communication device is able to access premium communication services without repeating the steps of authentication and/or authorization for the mobile communication device. In an embodiment, the time-to-live value associated with premium content access may be embedded in the cookie. A second time-to-live value may be associated with authentication extension and may indicate the length of time for which authentication may be extended to other untrusted communication devices without reauthorizing the mobile communication device. In an embodiment, the time-to-live value associated with premium content access may be a longer length of time (e.g., one month) than the time-to-live value associated with authentication extension (e.g., 20 minutes).

Further details about authenticating a mobile communication device for access to premium communication services over an untrusted network are described in U.S. patent application Ser. No. 13/005,859, filed Jan. 13, 2011, entitled "Premium Services Authentication," by Carl J. Persson, et al., U.S. patent application Ser. No. 13/937,191, filed Jul. 8, 2013, entitled "Authenticated Delivery of Premium Communication Services to Untrusted Devices Over An Untrusted Network," by Lyle T. Bertz, et al., and U.S. patent application Ser. No. 13/937,193, filed Jul. 8, 2013, entitled "Authenticated Delivery of Premium Communication Services to Trusted Devices Over An Untrusted Network," by Lyle T. Bertz, et al., which are all incorporated by reference in their entirety.

After the mobile communication device has been authorized to access the premium communication service over the untrusted network, then one or more communication devices may additionally be authenticated for access. The one or more communication devices may be referred to as untrusted communication devices because these devices may be limited to connecting to a communication network via an untrusted link, for example via a WiFi wireless communication link and/or a wired communication link as opposed to a cellular wireless communication link. An untrusted communication device may not be subscribed to receive cellular wireless communication service and may be referred to as a non-cellular communication device. It is understood that typically a cellular wireless communication link between a mobile communication device and the network is established by a base transceiver station, an enhanced node B, or a cell tower contingent on the mobile communication device first being authenticated, and hence such mobile communication devices may be deemed trusted communication devices.

The non-cellular communication device may be, for example, a flat screen television that connects to an untrusted network via a cable coupled from an Ethernet port on the television to a router. It is understood that the non-cellular communication device is associated with a mobile communication device; for example, a cellular wireless communication subscriber with a mobile communication device may own and/or have access to the non-cellular communication device and may wish to consume premium communication services that are provisioned to the mobile communication device using the non-cellular communication device instead.

For example, a cellular wireless communication service subscriber may wish to consume a streaming video premium communication service provisioned for his or her mobile phone using his or her flat screen television.

Authorization of a non-cellular communication device may be initiated by receiving an input signal. This input signal may be triggered by a user associated with the mobile communication device. For example, a cellular wireless communication service subscriber may physically press a button on the non-cellular communication device to initiate authentication. After receiving the input signal, the non-cellular communication device sends a request over the untrusted network to obtain a cookie and subsequently sends a request for premium service with the cookie over an untrusted network. In an embodiment, the request message sent from the non-cellular communication device may comprise an identifying number or an electronic serial number (ESN) associated with the non-cellular communication device.

The request message is sent from the non-cellular communication device to a router, for example a home network router, wherein a source IP address associated with the router is embedded in the message. This request message is then forwarded from the router to a session manager over an untrusted network. The session manager sends the request to a server, for example, an authentication server. The authentication server identifies the non-cellular communication device based on the source IP address of the request message and matches this source IP address with an IP address associated with an earlier message sent by a previously authenticated mobile communication device. After identifying the non-cellular communication device, in an embodiment, the authentication server may obtain the mobile directory number of the trusted mobile communication device and send a message to the trusted mobile communication device via a cellular wireless communication link. The message may request confirmation from the trusted mobile communication device before proceeding with authentication of the untrusted non-cellular communication device.

After the optional confirmation, the authentication server then checks a time-to-live value associated with authentication extension to determine if the authentication request was received within a specific time period. If the request was received within the specific time period, then the authentication server creates a cookie, along with a new time-to-live value associated with premium content access, and sends these to the session manager. The new time-to-live value associated with premium content access may indicate for how long the non-cellular communication device may utilize the cookie for accessing premium content. The session manager stores the cookie and sends a copy of the cookie to the non-cellular communication device via the router. The non-cellular communication device then builds a request for premium communication service with the cookie and sends the request to the session manager via the router over the untrusted network. The session manager matches the cookie in the request message with the cookie cached at the session manager earlier. The session manager strips off the cookie and sends the request to a media gateway.

The media gateway sends the request to a provider of the premium communication service. The provider of the premium communication service returns the requested service, for example streams video content, back to the media gateway. The media gateway relays the service to the session manager, and the session manager returns the service to the non-cellular communication device via the router, for example streaming video to the non-cellular communication device.

The methods of obtaining premium services over an untrusted network may promote selling premium communication services and increasing revenues of a wireless service provider while not overburdening the radio access network with traffic. For example, the bandwidth consuming delivery of streaming video may be diverted to an untrusted network that may comprise an inherently less expensive infrastructure. Additionally, extending authentication from a trusted communication device to one or more untrusted communication devices may promote a simplified method for users to authenticate one or more devices at a time in order to facilitate the access of premium communication services.

Turning now to FIG. 1, a communication system 100 is described. In an embodiment, the system 100 comprises a mobile communication device 102, a wireless access point 118, a cellular base transceiver station 120, a router 121, a network 122, a media gateway (MG) 124, an authentication server 126, a session manager 130, a subscription profile server 132, a premium communication service server 134, and a communication device 150. It is understood that the system 100 may comprise any number of the components 102, 118, 120, 121, 124, 126, 130, 132, 134, and/or 150. The media gateway 124, the authentication server 126, the session manager 130, the subscription profile server 132, and the premium communication service server 134 may be implemented as computer systems. Computer systems are described in more detail hereinafter.

The mobile communication device 102 may be a mobile phone, a personal digital assistant (PDA), a media player. The mobile communication device 102 may also be a laptop computer, a tablet computer, or a notebook computer. In an embodiment, the mobile communication device 102 may be implemented as a handset. Handsets are described in more detail hereinafter. The mobile communication device 102 is provisioned to receive wireless communication service by a wireless communication service provider, for example to receive voice and/or data communication service via a wireless link to a radio access network (RAN) operated or leased by the service provider. The mobile communication device 102 comprises a cellular radio transceiver 104, a short range radio transceiver 106, a processor 108, and a memory 110. In an embodiment, the short range radio transceiver 106 may be a WiFi radio transceiver. Memory 110 in the mobile communication device 102 may store an application 112, which may access premium communication services, as well as an authentication payload 114 and cookie 116, which may be used during authentication.

The cellular radio transceiver 104 is configured to establish a radio communication link with the base transceiver station 120 based on one or more of a code division multiple access (CDMA) wireless communication protocol, a global system for mobile communications (GSM) wireless communication protocol, a long-term evolution (LTE) wireless communication protocol, a worldwide interoperability for microwave access (WiMAX) wireless communication protocol, or another cellular wireless communication protocol. The base transceiver station 120 provides connectivity to the network 122 to the mobile communication device 102. The network 122 comprises one or more private networks, one or more public networks, or a combination thereof. The network 122 promotes communication as desired among the several components 118, 120, 124, 126, 130, 132, 134, 150.

The short range radio transceiver 106 is configured to establish a radio communication link with the wireless access point 118 based on a WiFi wireless communication protocol, a Bluetooth® wireless communication protocol, or based on another short range wireless communication protocol. As used herein, short range refers to wireless communication that is limited to establishing radio links over a maximum distance of 1000 feet or less; long range refers to wireless communication that is limited to establishing radio links over a maximum distance of at least 2000 feet and under some circumstances a maximum distance of several miles. The wireless link in cellular wireless communications typically is established using long range wireless transceivers; the wireless link in WiFi wireless communications and Bluetooth® wireless communications, for example, typically is established using short range wireless transceivers.

In an embodiment, the user of the mobile communication device 102 is subscribed to one or more premium communication services such as a streaming video service, supplemental sports content (i.e., listen in on NASCAR pit-crew chatter, listen in on mic-ed NFL football player, and the like), fantasy sports league data feeds, and others. While it is understood that it is the user that is subscribed to the subject premium communication service, in some contexts herein, the disclosure may state that the mobile communication device 102 is subscribed to the premium subscription service. The premium service 134 may be a server computer that propagates the subject communication to the user, for example to the mobile communication device 102 or to another device (e.g., communication device 150) that the user wishes to use to consume the premium communication service.

The communication associated with the premium communication service may be transmitted to the mobile communication device 102 via the wireless access point 118 and router 121. This wireless link may be referred to as an untrusted network in some contexts. The term untrusted is used to distinguish between the level of trust accorded to the communication between the base transceiver station 120 and the cellular transceiver 104 as well as other nodes of a wireless communication service provider infrastructure and the level of trust accorded to the communication between the wireless access point 118 and the short range wireless transceiver 106 and from the wireless access point 118 via the router 121 back into the network 122. The untrusted network may also refer to communication from the router 121 and other infrastructure beyond the network 122.

It is generally assumed that the base transceiver station 120 cannot be spoofed and that the wireless communication link between the cellular transceiver 104 and the base transceiver station 120 cannot be hacked. It is thought that the wireless access point 118 can be spoofed (e.g., a device can successfully fool the wireless access point 118 that it is the short range radio transceiver 106 and/or the mobile communication device 102 when in fact it is not). The wireless communication link between the short range radio transceiver 106 and the wireless access point 118 or the link from the wireless access point 118 via the router 121 to the network 122 can also be hacked, and hence, these links may be deemed as untrusted links or an untrusted network.

It may be desirable to deliver the premium communication service via the untrusted network (e.g., via the router 121 and/or via the wireless access point 118) to reduce the traffic load on the trusted network (e.g., the wireless communication link between the cellular radio transceiver 104 and the base transceiver station 120). It is understood that the radio spectrum and/or bandwidth of the base transceiver station 120 is limited and that adding one or more base transceiver stations 120 to the radio access network of the wireless service provider to carry increased traffic is expensive and time consuming. On the other hand, adding additional wireless access points 118, for example additional WiFi hot spots, may be relatively inexpensive and may be completed with a quick turn-around time. Furthermore, a cellular wireless communication service subscriber may desire to consume premium communication services that are provisioned to a mobile communication device using a non-cellular communication device instead, wherein the non-cellular communication device is only coupled to the untrusted network. Therefore, the mobile communication device 102 may receive authorization to request and obtain premium communication service content on the mobile communication device 102 over the untrusted network, and this authentication may subsequently be extended for premium content access on other communication devices.

Under some circumstances, the user may wish to consume premium communication services using the communication device 150 rather than using the mobile communication device 102. The communication device 150 may be a computer, television, network appliance, and/or display. In an embodiment, the communication device 150 does not have a cellular radio transceiver. In some contexts, the communication device 150 may be referred to as a non-cellular communication device. The communication device 150 comprises one or more input/output (I/O) devices 151, a short range radio transceiver 152, for example a WiFi radio transceiver, and a premium services application 154. The one or more I/O devices 151 may include a video monitor, liquid crystal display (LCD), touch screen display, or other types of displays. The one or more I/O devices 151 may also include one or more control buttons and/or other input devices. The communication device 150 may be owned by and/or accessible to the user of the mobile communication device 102 or the user provisioned to access premium communication service. The communication device 150 may send and/or receive data via a wired or wireless communication link. In an embodiment, the communication device 150 may connect to an untrusted network via a wired Ethernet port connection or through a wireless WiFi connection, wherein both connections utilize a common router (e.g., router 121).

In some contexts, the communication device 150 may be referred to as an untrusted device because it may connect to the network 122 via the untrusted network, for example, via a wireless communication link between the short range radio transceiver 152 and the wireless access point 118 and then via the router 121. The communication device 150 corresponds to the device referred to as a non-cellular communication device above. In an embodiment, the communication device 150 may be a flat screen television having a WiFi radio transceiver 152, and the wireless access point 118 may be a WiFi hot spot in the user's home. In an alternative embodiment, the communication device 150 may be a flat screen television that connects to the untrusted network via a cable coupled from an Ethernet port on the television to the router 121. Conventionally, authenticating access to premium communication services for the communication device 150 may entail the entry of one or more security codes. However, in an embodiment, the communication device 150 may not have an advanced user interface (e.g., a keyboard) that may allow convenient user input of security codes for access via the WiFi network. This deficiency in the communication device 150 raises the question of how to authenticate and authorize the short range radio transceiver 152 and/or the communication device 150 efficiently for accessing premium communication services over the untrusted network.

Figure 2:
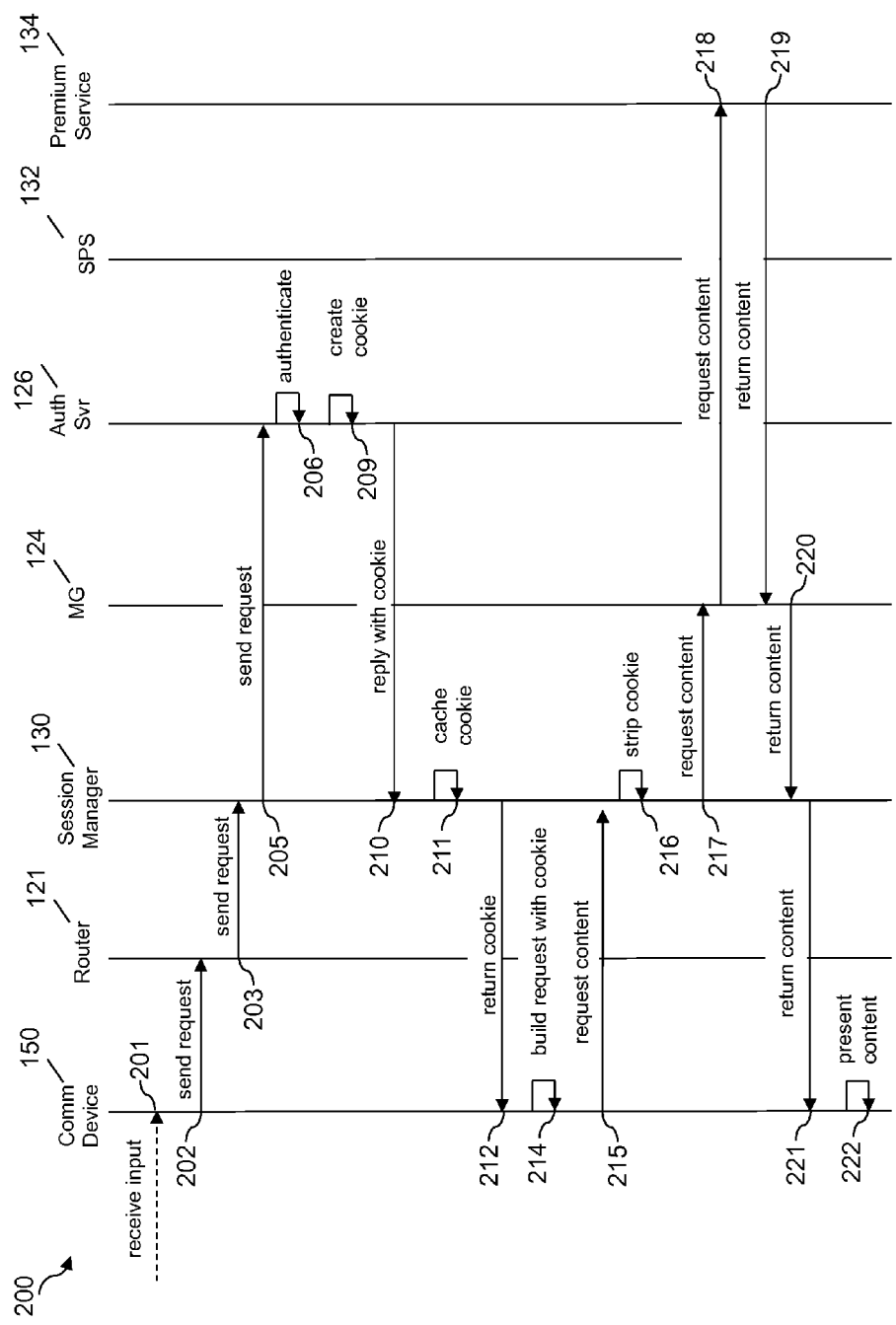
FIG. 2 is a message sequence diagram according to an embodiment of the disclosure.

Turning now to FIG. 2, a message sequence 200 is described. At label 201, the communication device 150 receives an input signal from an I/O device 151. In an embodiment, an input signal may be triggered by one or more control buttons that are physically pressed on the communication device 150 by the user associated with the mobile communication device 102 and communication device 150. In another embodiment, the input signal may be triggered by an infrared signal received by the communication device 150 from a remote control, wherein the infrared signal results from the user pressing a button on the remote control. The input signal may be triggered by the user after the mobile communication device 102 has been authenticated for premium content access. The communication device 150 may receive the input signal within a period of time indicated by a time-to-live value associated with authentication extension. This time-to-live value may be previously assigned by an authentication server 126 or selected by the user during the prior authentication of the trusted mobile communication device 102.

After receiving the input signal, the communication device 150 at label 202 sends a request message to the router 121. In an embodiment, the request message may comprise an electronic serial number (ESN) or an identifying number associated with the communication device 150. At label 203, the request message is forwarded from the router 121 to the session manager 130 over the network 122. The request message sent by the router 121 comprises a header that includes the IP address of the router. For example, the router sends a request message in an IP datagram, and the IP address of the router is stored in the source address field of the IP header portion of the IP datagram. The session manager 130 copies the IP address of the router from the request message sent at label 203 into a request message 205 (e.g., into a payload portion of the request message 205), then sends the request message 205 to the authentication server 126. The request message 205 comprises at least some of the request message content sent by the router 121 at label 203 (e.g., the request for service sent by the communication device 102).

At label 206, the authentication server 126 authenticates the communication device 150 based on the IP address of the router 121 embedded by the session manager 130 in the payload portion of the request message 205 and based on the previously assigned time-to-live value. For example, the source IP address of the router 121 may be matched with the IP address associated with a message sent earlier by the previously authenticated mobile communication device 102. That is, the authentication server 126 may determine that the authentication request message 205 is originating from the same network path as the previous requests from the mobile communication device 102 (e.g., through the access point 118, media gateway 124, and network 122). Once the IP addresses are matched, in an embodiment, the authentication server 126 may obtain the mobile directory number of the mobile communication device 102 and send a message to the mobile communication device 102 via a cellular wireless communication link (e.g., through the network 122, base transceiver station 120, and the cellular transceiver 104).

The message may request confirmation from the mobile communication device 102 before proceeding with authentication of communication device 150. Additionally at label 206, the authentication server 126 may check the previously assigned time-to-live value associated with authentication extension. In an embodiment, the time-to-live value may be assigned by an authentication server 126 during authentication of the mobile communication device 102. Alternatively, the time-to-live value may be selected by a user of the mobile communication device 102 when sending an initial request for authentication. The authentication server determines if the authentication request message 205 was received within the time period indicated by the time-to-live value. If the authentication request message 205 is received within the length of time indicated by the time-to-live value, then the authentication of the mobile communication device 102 may be extended to the communication device 150.

After authenticating the communication device 150, the authentication server 126 creates a cookie at label 209. In an embodiment, the cookie may comprise an embedded electronic serial number (ESN) or identifying number of the communication device, as well as a new time-to-live value associated with premium content access. The newly added time-to-live value may indicate a temporary period of time for which the cookie is valid. For example, the cookie may be valid for the next 24 hours, week, or month. The communication device 150 may utilize the cookie to access premium content until the cookie expires, as indicated by the time-to-live value. That is, the communication device 150 may access premium content for only the next 24 hours.

After creating the cookie, the authentication server 126 then sends a reply message 210 including the cookie to the session manager 130. At label 211, the session manager 130 caches or stores the cookie in such a way that the cookie can be easily looked up or retrieved in the future. In an embodiment, the cookie may be cached or stored at the session manager 130 in relation to the source IP address associated with the previous request message 203 received (via the router 121) from the communication device 150. Next, the session manager 130 sends a return message 212 including the cookie or a copy of the cookie to the communication device 150 via the untrusted network, for example via the wireless communication link between the short range radio transceiver 152, the wireless access point 118, and the router 121.

At label 214, the communication device 150 builds a request for a premium communication service including the cookie and sends a request content message 215 including the cookie to the session manager 130 via the untrusted network, for example via the wireless communication link between the short range radio transceiver 152, the wireless access point 118, and the router 121. At label 216, the session manager 130 identifies the cookie sent by the communication device 150. The cookie of the request content message 215 may be matched with the cookie cached at the session manager 130 previously at label 211. The session manager 130 strips off the cookie and sends the request content message 217 to the media gateway 124.

The media gateway 124 sends a request content message 218 to the premium communication service server 134. The premium communication service server 134 may be identified, at least in part, by the request content message 215. For example, the request content message 215 may identify a streaming video premium communication service, and the media gateway 124 may identify the premium communication service server 134 based on the request for streaming video premium communication service.

The premium communication service server 134 sends a return content message 219 (e.g., sends content or data requested, for example streaming video or other communication content or data) to the media gateway 124. The media gateway 124 sends a return content message 220 (e.g., relays the content sent by the premium communication service server 134) to the session manager 130. The session manager sends a return content message 221 (e.g., relays the content sent by the media gateway 124) to the communication device 150 via the untrusted network, for example via the wireless communication link between the short range radio transceiver 152, the wireless access point 118, and the router 121. At label 222, the communication device 150 presents the content on an I/O device 151, for example, presents content on a display of the communication device 150. In this way, authentication is extended from a mobile communication device 102 to communication device 150, and premium communication service content is provided to the communication device 150 over an untrusted network. Not only may communication device 150 be authenticated to access premium communication services over an untrusted network, but authentication may be extended from mobile communication device 102 to more than one communication device.

Figure 3:
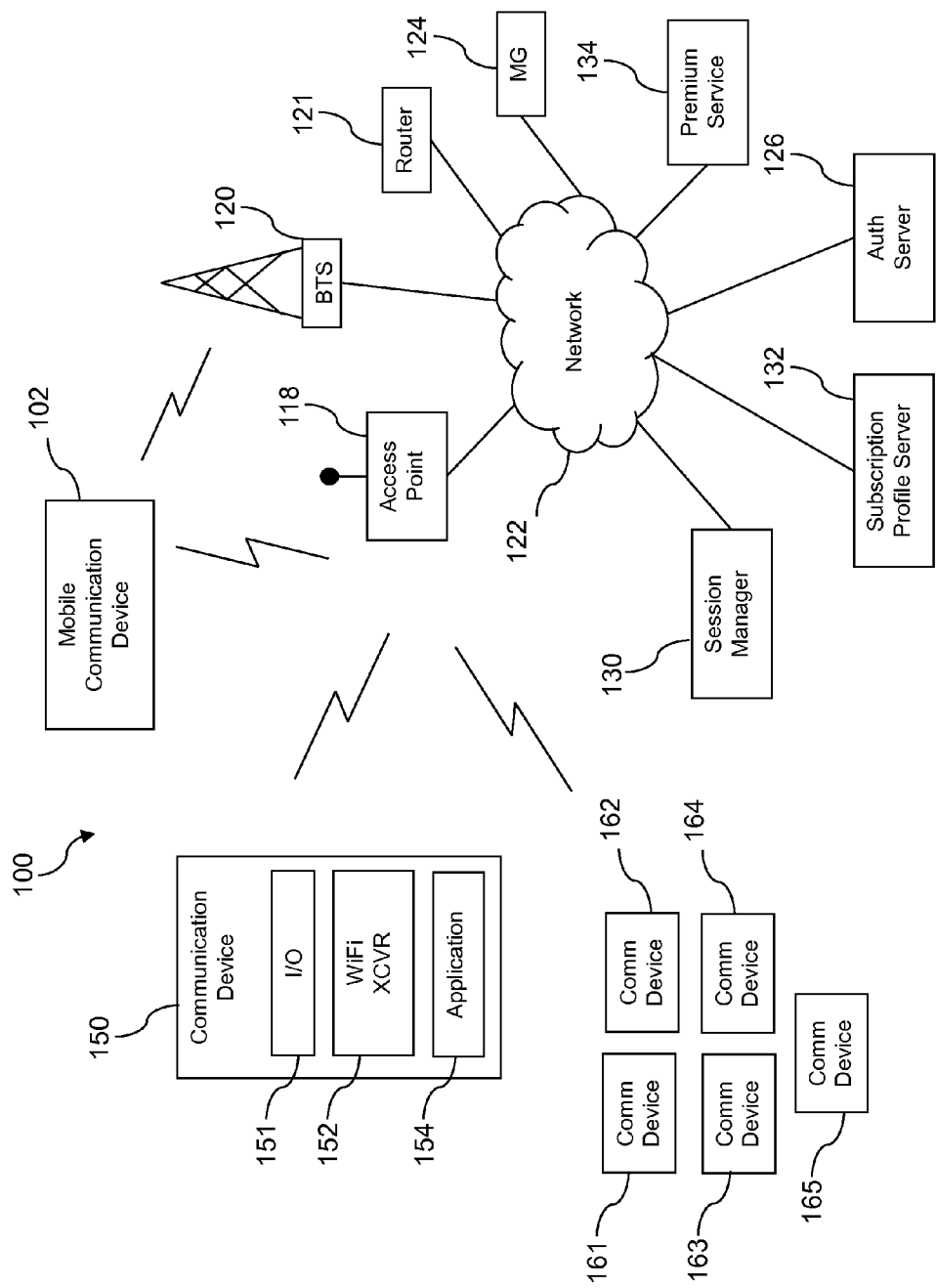
FIG. 3 is a block diagram of a communication system according to an embodiment of the disclosure.

Turning now to FIG. 3, further details of system 100 are described. In an embodiment, the system 100 further comprises a plurality of communication devices 161-165. The plurality of communication devices 161-165 may be computers, televisions, network appliances, and/or displays. In an embodiment, the communication device 150 does not have a cellular radio transceiver. In some contexts, the plurality of communication devices 161-165 may be referred to as non-cellular communication devices. Each of the communication devices 161-165 comprise one or more input/output (I/O) devices, a short range radio transceiver, for example a WiFi radio transceiver, and a premium services application, wherein these components are similar to 151, 152, and 154 in communication device 150. The one or more I/O devices may include a video monitor, liquid crystal display (LCD), touch screen display, or other types of displays. The one or more I/O devices may also include one or more control buttons and/or other input devices. The plurality of communication devices 161-165 may be owned by and/or accessible to the user of the mobile communication device 102 or the user provisioned to access premium communication service. The plurality of communication devices 161-165 may each send and/or receive data via a wired or wireless communication link. In an embodiment, the plurality of communication devices 161-165 may each connect to an untrusted network via a wired Ethernet port connection or through a wireless WiFi connection, wherein both connections utilize a common router (e.g., router 121).

In an embodiment, a cellular wireless communication subscriber with a mobile communication device (e.g., mobile communication device 102) may consume premium communication services that are provisioned to the mobile communication device using up to six different devices, in addition to the mobile communication device. That is, up to six different devices, such as communication device 150 and the plurality of communication devices 161-165, may be authorized at a time for accessing premium content over an untrusted network. In alternate embodiments, other limits may also be utilized for the number of different devices authorized for accessing premium content. In an embodiment, the plurality of communication devices (150, 161-165) may be authenticated for access if the corresponding authentication requests are received within the period of time indicated by the time-to-live value associated with authentication extension, wherein this time-to-live value is previously assigned during authentication of the mobile communication device 102. For example, the source IP address associated with a message previously received from the authenticated mobile communication device 102 may only be cached at the session manager 130 and/or authentication server 126 for a certain period of time (e.g., 20 minutes).

All six communication devices (150, 161-165) may be authenticated if all the initial requests for cookies are received within the specified time period. Hence, the authentication server 126 may check the time-to-live value associated with authentication extension and also keep track of how many devices are authenticated at a time. For example, communication device 161 may send a request message to authentication server 126, wherein the request message is initially sent to router 121, session manager 130, and then forwarded to authentication server 126. The authentication server 126 may check the time-to-live value associated with authentication extension, along with the source IP address associated with the received request message and determine if there are any other authenticated devices associated with the received source IP address. If the request is received within the period of time indicated by the time-to-live value associated with authentication extension, then the authentication server 126 may match the received source IP address with the a previously stored source IP address associated with messages received from the mobile communication device 102 and the communication device 150, wherein both devices have already been authenticated for accessing premium content over the untrusted network.

Since only one communication device (e.g., 150) in addition to the mobile communication device 102 has been authenticated at this point, the authentication server 126 may proceed with the authentication of communication device 161 and create a cookie, wherein the cookie may comprise an embedded electronic serial number (ESN) or an identifying number of the communication device 161 and a new time to live value associated with premium content access. The authentication server 126 may send the cookie to the session manager 130, wherein the cookie is stored. The session manager 130 may return the cookie via the router 121 to communication device 161, which may subsequently utilize the cookie to access premium communication services over the untrusted network, as described above in message sequence 200. After the communication device 161 has been authenticated, the remaining communication devices 162-165 may also be authenticated in the same manner to access premium content via cookies specific to each device. Once the limit of six communication devices (e.g., 150, 161-165) or another device number limit for authentication extension has been reached, the authentication server 126 may no longer authenticate any more devices. If any additional requests are made by other communication devices, wherein the source IP address of the request messages correspond to the source IP address associated with a message received from the mobile communication device 102, the authentication server 126 may deny authentication and send back a message to each device requesting access, wherein the message indicates that the request has been denied.

Furthermore, the authentication server 126 may also time out the cookies of communication devices 150, 161-165 after a certain period of time has passed as designated by the time-to-live value associated with premium content access. That is, the cookies obtained by the communication devices 150, 161-165 may no longer be valid and used to access premium content after the time-to-live value associated with premium content access has exceeded. In another embodiment, the authentication server 126 may time out the authentication of communication devices 150, 161-165 if the user associated with the mobile communication device 102 is no longer authorized to access the premium communication service.

Access to the premium communication service may be disrupted if the user associated with the mobile communication device 102 has cancelled his or her subscription account. Alternatively, the user associated with the mobile communication device 102 may no longer be subscribed to receive premium content if there are outstanding debts on his or her subscription account. Once this premium content access has been discontinued, the cookie obtained by the mobile communication device 102 may expire, along with the subsequent expiration of the cookies assigned to communication devices 150, 161-165, which were authenticated by extending authentication from the mobile communication device 102. In an embodiment, the source IP address of the router 121 may change or be reallocated by dynamic host configuration protocol (DHCP) after a certain period of time, wherein request messages from communication devices 150, 161-165 are transmitted through the router 121.

If the communication devices 150, 161-165 have already been authenticated and have each received a specific cookie, the devices may continue to access premium communication services after the source IP address of the router 121 has changed. The communication devices 150, 161-165 may be able to receive premium content for as long as each of the cookies are still valid (e.g., the time-to-live value associated with premium content access has not expired). In an embodiment, each of the cookies may comprise the time-to-live value associated with premium content access and the embedded electronic serial number (ESN) or the identifying number corresponding to the specific communication device (150, 161-165), which allows the cookies to be identified and verified when requesting access to premium communication services. This feature may allow communication devices that connect to a network through a router with a static or dynamic IP address to maintain premium content access on the untrusted network.

In addition to tracking the number of authenticated communication devices and corresponding time-to-live values, the authentication server 126 may manage the delivery of an optional confirmation message to the mobile communication device 102 upon receiving an initial request for authentication from a new or unrecognized communication device. For example, the user associated with the mobile communication device 102 may wish to consume premium communication services on a new communication device that has not yet been authenticated. In an embodiment, when an untrusted communication device (e.g., 150, 161-165) sends a request message to the authentication server 126 via the session manager 130, the authentication server 126 may match the source IP address in the request message with a previously stored source IP address associated with an earlier message received from the mobile communication device 102. Additionally, the authentication server 126 may have access to the mobile directory number (MDN, e.g., the phone number of the mobile communication device 102) which may be obtained during an earlier authentication of the mobile communication device 102.

In an embodiment, the authentication server 126 may use the mobile directory number to transmit a message to the mobile communication device 102, wherein the message requests a confirmation from the mobile communication device 102 before proceeding with authentication of the untrusted communication device (e.g., 150, 161-165) in accessing the premium communication service of interest. A confirmation message may be transmitted to the mobile communication device 102 via the cellular wireless communication link or via some other trusted out-of-band communication path. In an embodiment, the message transmitted to the mobile communication device 102 may be a short message service (SMS) text message that asks the user associated with the mobile communication device 102 to verify the request to provide access to the untrusted communication device (e.g., 150, 161-165). The message may ask if the untrusted communication device (e.g., 150, 161-165) is associated with the user of the mobile communication device 102. In an embodiment, the mobile communication device 102 may present the confirmation message on a display of the mobile communication device 102. The user may input a "yes" or "no" in response to the confirmation message and confirm the request.

The authentication server 126 may also send a confirmation message to the mobile communication device 102 if an authentication request is received from an unrecognized IP address or geographic location. For example, the user associated with the mobile communication device 102 may visit a different geographic location and wish to consume premium communication services on a new device, such as a television in his or her hotel room, wherein the television is associated with an unrecognized IP address. In an embodiment, the mobile communication device 102 may receive a confirmation message that requests verification of the different location or unrecognized IP address. The user associated with the mobile communication device 102 may approve or verify the request in order to surpass the security messages and proceed with authentication as described above in message sequence 200. The optional confirmation message may provide an extra layer of security to prevent unauthorized devices that are not associated with the mobile communication device 102 from accessing premium communication services.

Figure 4:
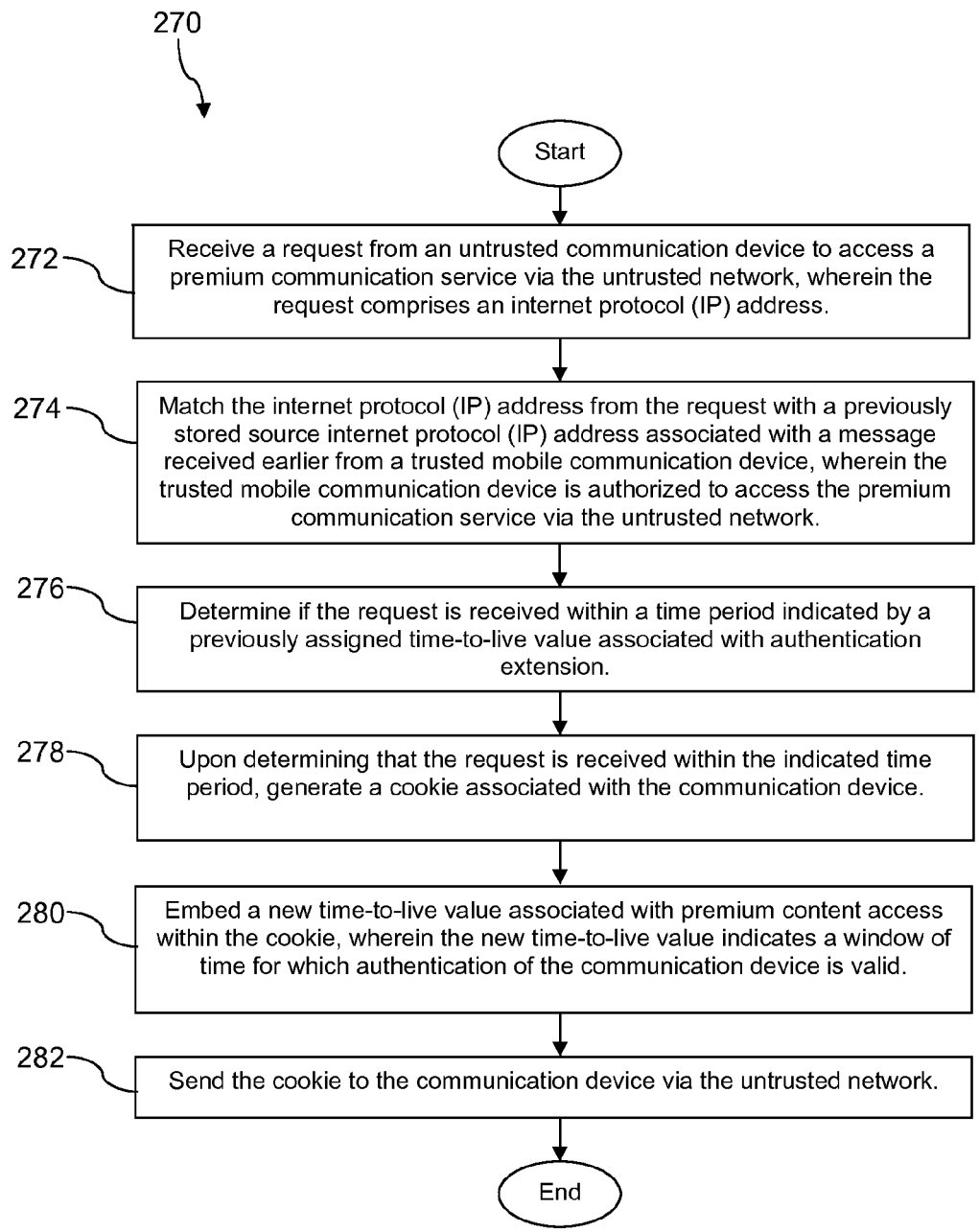
FIG. 4 is a flow chart of a method according to an embodiment of the disclosure.

Turning now to FIG. 4, a method 270 is described. In FIG. 4, an embodiment in which an authentication server (e.g., 126) provides an untrusted communication device (e.g., 150, 161-165) with access to premium communication services in an untrusted network is shown. At block 272, the authentication server may receive a request from an untrusted communication device to access a premium communication service via the untrusted network, wherein the request comprises an internet protocol (IP) address. In an embodiment, the authentication server 126 may receive a request from the communication device 150 to access premium content, wherein a source IP address associated with the router 121 is embedded in the request. At block 274, the authentication server may match the internet protocol (IP) address from the request with a previously stored source internet protocol (IP) address associated with a message received earlier from a trusted mobile communication device, wherein the trusted mobile communication device is authorized to access the premium communication service via the untrusted network. In an embodiment, the authentication server 126 may match the source IP address of the request message with an IP address associated with a message sent earlier by the previously authenticated mobile communication device 102.

The previously authenticated mobile communication device 102 may be a trusted device that has been authorized for premium content access. At block 276, the authentication server may determine if the request is received within a time period indicated by a previously assigned time-to-live value associated with authentication extension. In an embodiment, the authentication server 126 may check if the request from the communication device 150 is received within the time period indicated by the time-to-live value associated with authentication extension. In an embodiment, the time-to-live value associated with authentication extension may be assigned by an authentication server 126 during authentication of the mobile communication device 102. At block 278, upon determining that the request is received within the indicated time period, the authentication server may generate a cookie associated with the communication device. In an embodiment, the authentication server 126 may create a specific cookie for the communication device 150, wherein the cookie may comprise an electronic serial number (ESN) or an identifying number associated with the communication device 150.

At block 280, the authentication server may embed a new time-to-live value associated with premium content access within the cookie, wherein the new time-to-live value indicates a window of time for which authentication of the communication device is valid. In an embodiment, the authentication server 126 may embed the time-to-live value associated with premium content access in the cookie in order to indicate a window of time for which the communication device 150 may access the premium communication service. At block 282, the authentication server may send the cookie to the communication device via the untrusted network. In an embodiment, the authentication server 126 may send the cookie to the communication device 150 via the router 121 over the untrusted network.

Figure 5:
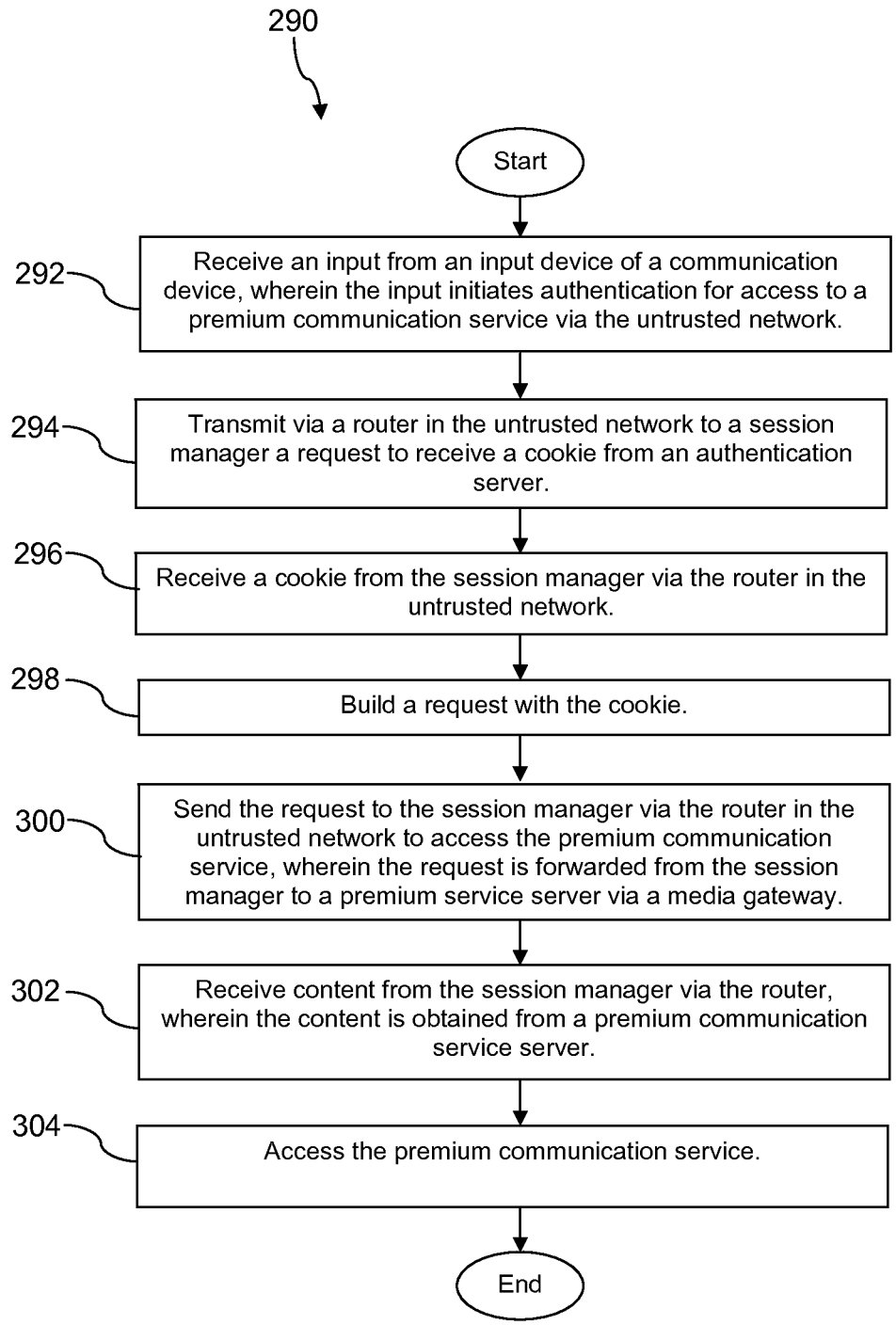
FIG. 5 is a flow chart of another method according to an embodiment of the disclosure.

FIG. 5 is a flowchart of a method 290. In FIG. 5, an embodiment in which an untrusted communication device (e.g., 150, 161-165) requests and accesses premium communication services in an untrusted network is shown. At block 292, the communication device may receive an input from an input device of a communication device, wherein the input initiates authentication for access to a premium communication service via the untrusted network. In an embodiment, the communication device 150 may receive an input signal that is triggered by a user associated with the mobile communication device 102 and communication device 150. At block 294, the communication device may transmit via a router in the untrusted network to a session manager a request to receive a cookie from an authentication server. In an embodiment, the communication device 150 may transmit a request to the session manager 130 via the router 121 to receive a cookie from the authentication server 126. At block 296, the communication device may receive a cookie from the session manager via the router in the untrusted network. In an embodiment, the communication device 150 may receive a cookie from the session manager 130 via the router 121 in the untrusted network.

At block 298, the communication device may build a request with the cookie, and at block 300, the communication device may send the request to the session manager via the router in the untrusted network to access the premium communication service, wherein the request is forwarded via a media gateway to the premium communication service server. In an embodiment, the communication device 150 may build a request with the cookie and send the request to the session manager 130 via the router 121 in the untrusted network in order to access premium content, wherein the request may be forwarded from the session manager 130 to the premium service 134 via the media gateway 124. At block 302, the communication device may receive content from the session manager via the router, wherein the content is obtained from a premium communication service server. In an embodiment, the communication device 150 may receive content from the session manager 130 via the router 121, wherein the content is obtained from a premium communication service server 134. At block 304, the communication device may access the premium communication service. In an embodiment, the communication device 150 may access premium content from the premium communication service server 134.

Figure 6:
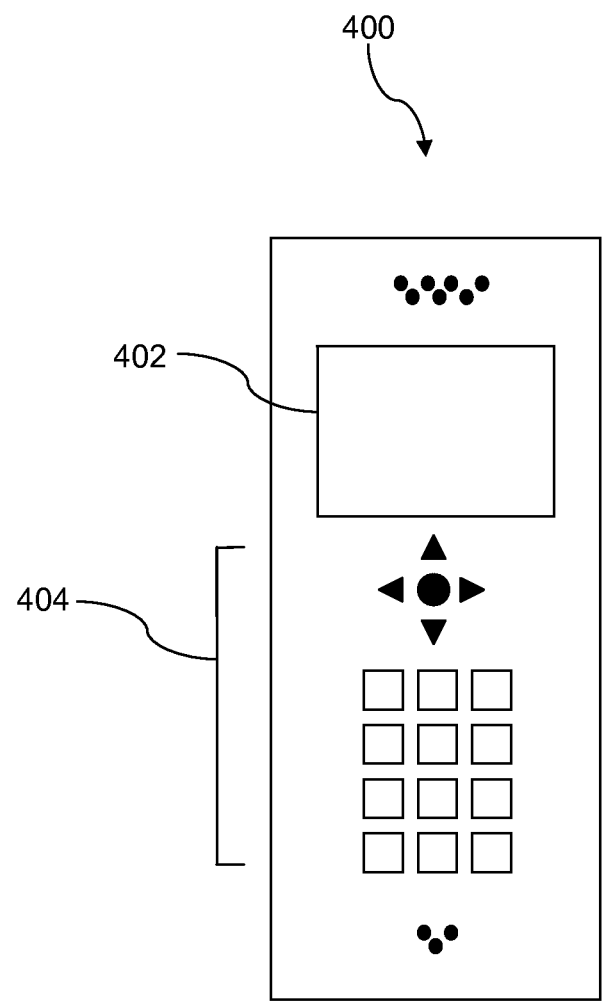
FIG. 6 is a block diagram of a hardware architecture of a mobile communication device according to an embodiment of the disclosure.

FIG. 6 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 7:
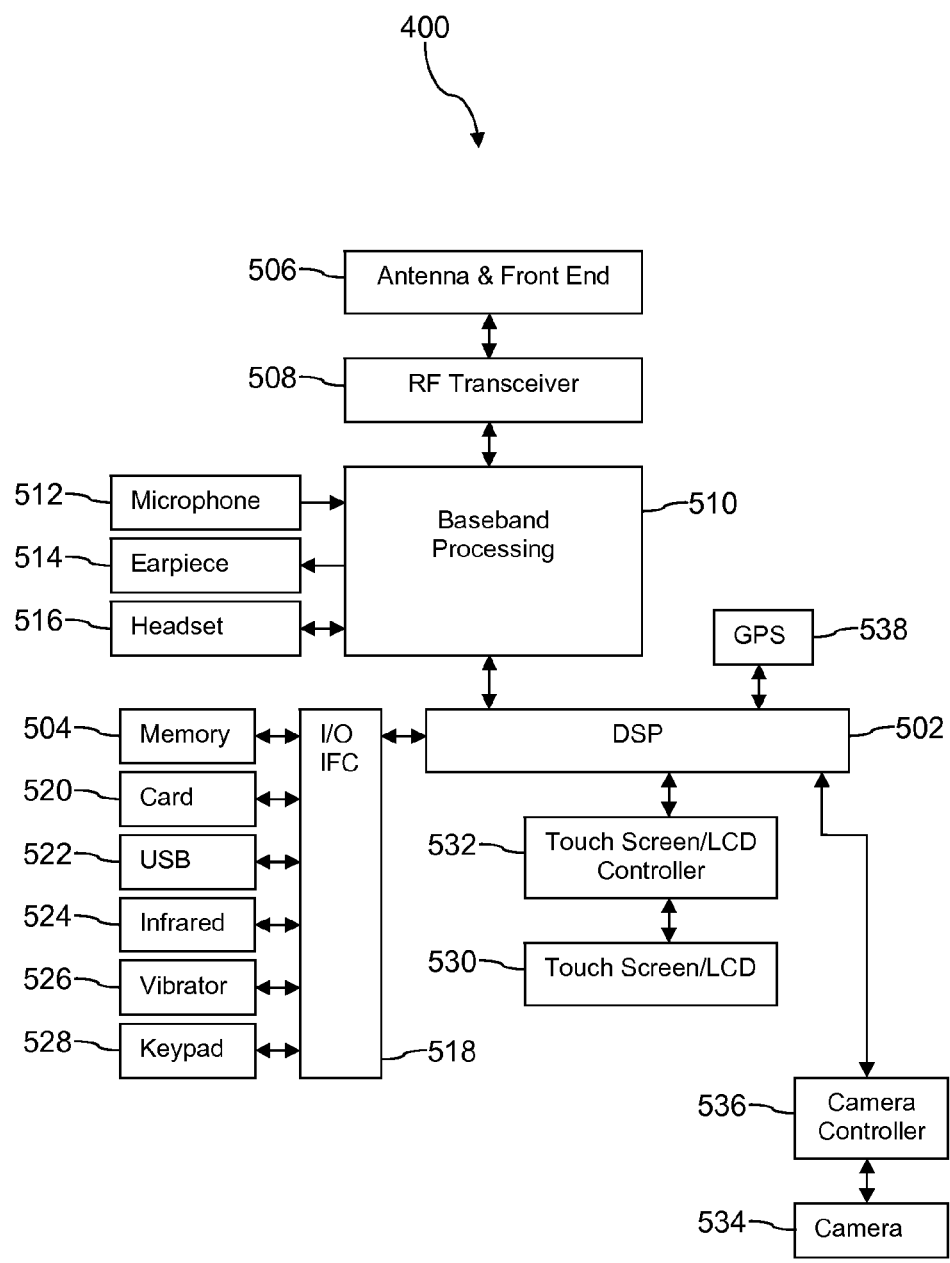
FIG. 7 is a block diagram of a software architecture of a mobile communication device according to an embodiment of the disclosure.

FIG. 7 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 8A:
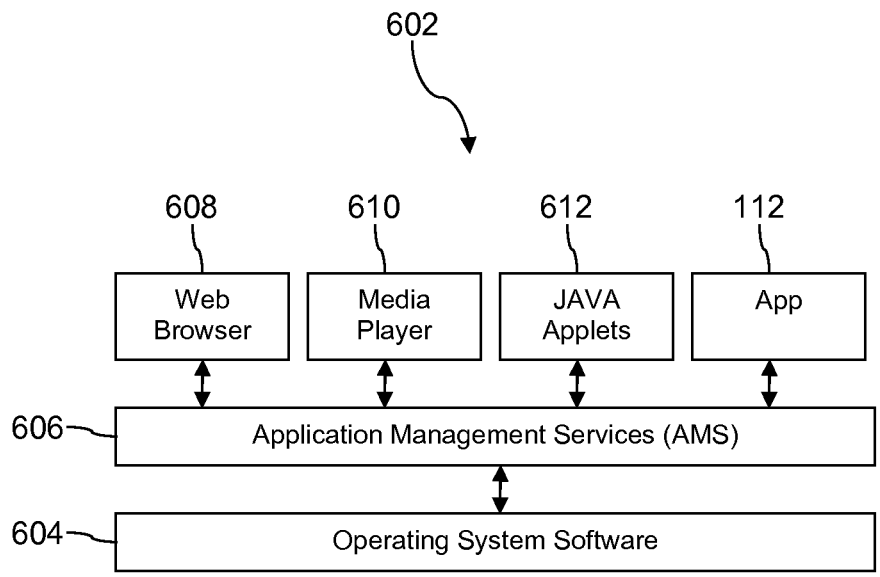
FIG. 8A is another block diagram of a software architecture of a mobile communication device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 8A are a web browser application 608, a media player application 610, JAVA applets 612, and premium communication service application 112. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The premium communication services application 112 is described further above.

Figure 8B:
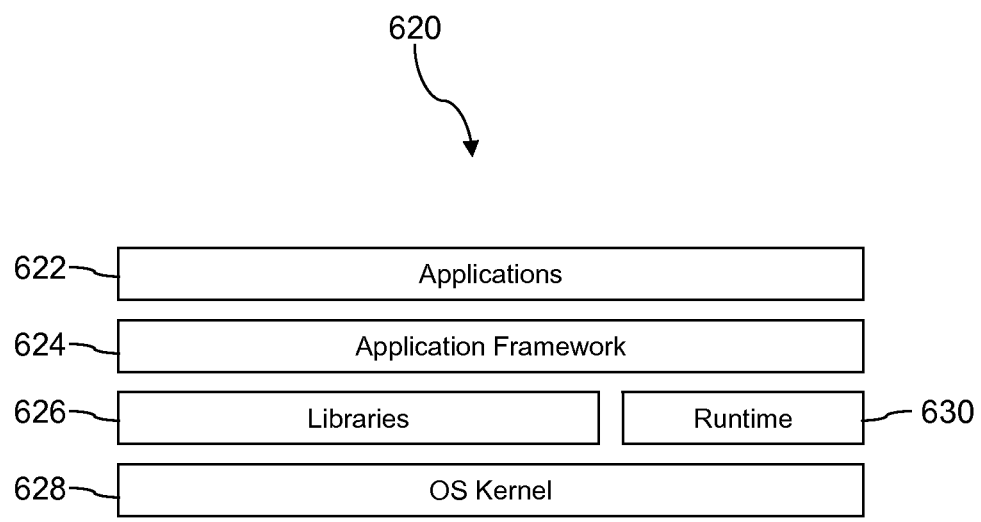
FIG. 8B is another block diagram of a software architecture of a mobile communication device according to an embodiment of the disclosure.

FIG. 8B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
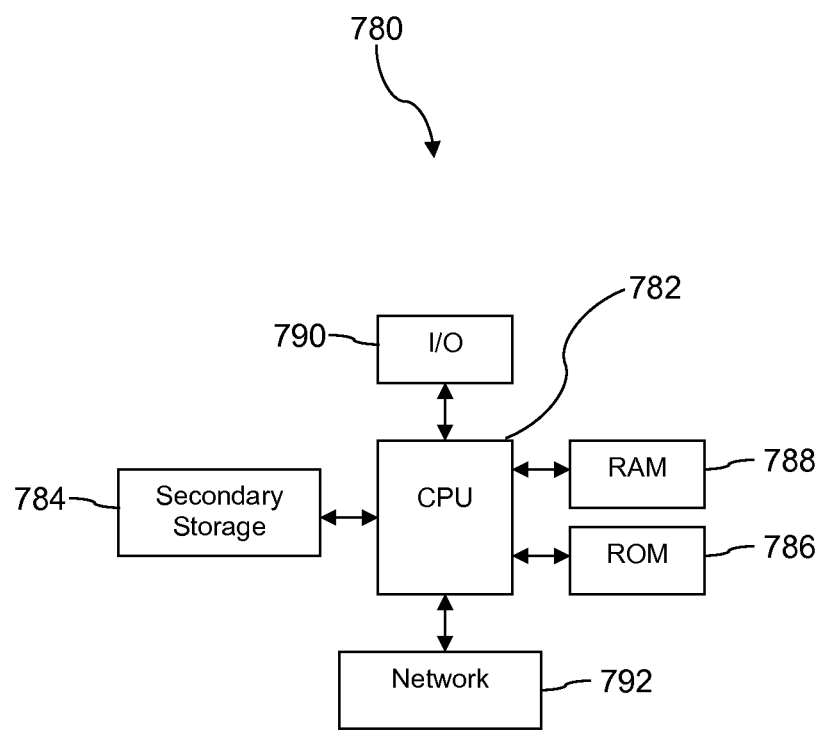
FIG. 9 is a block diagram of a computer system according to an embodiment of the disclosure.

FIG. 9 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of an authentication server providing premium communications services via an untrusted network, comprising:
   receiving a request from an untrusted communication device to access a premium communication service via the untrusted network, wherein the request comprises an internet protocol (IP) address of a router; and
   authenticating the untrusted communication device for a time period based on a time-to live value included in an earlier authentication for a trusted mobile communication device, the authenticating comprising:

matching the IP address of the router from the request with a previously stored source IP address of the router associated with a message received earlier from the trusted mobile communication device, wherein the trusted mobile communication device is authorized to access the premium communication service via the untrusted network;

upon matching the IP address of the router from the request with the previously stored source IP address of the router associated with the message sent by the trusted mobile communication device, obtaining a mobile directory number of the trusted mobile communication device;

sending a message to the mobile directory number of the trusted mobile communication device via a cellular wireless communication link, wherein the message requests a confirmation from the trusted mobile communication device before proceeding with authentication of the untrusted communication device in accessing the premium communication service;

in response to the confirmation, determining whether the request is received within the time period indicated by the time-to-live value included in the earlier authentication for the trusted mobile communication device;

upon determining that the request is received within the indicated time period, generating a cookie associated with the untrusted communication device;

embedding a new time-to-live value associated with premium content access within the cookie, wherein the new time-to-live value indicates a window of time for which extended authentication of the untrusted communication device is valid; and sending the cookie to the untrusted communication device via the untrusted network, wherein the untrusted communication device and the trusted mobile communication device are different devices.

2. The method of claim 1, wherein the previously assigned time-to-live value associated with authentication extension is assigned by the authentication server or selected by a user associated with the trusted mobile communication device during the prior authentication of the trusted mobile communication device.

3. The method of claim 1, wherein the request further comprises an identifying number or an electronic serial number associated with the untrusted communication device.

4. The method of claim 1, wherein the message sent to the trusted mobile communication device is a short message service message.

5. The method of claim 1, wherein the cellular wireless communication link is established according to one of a code division multiple access wireless communication protocol, a global system for mobile communications wireless communication protocol, a long-term evolution wireless communication protocol, or a worldwide interoperability for microwave access wireless communication protocol.

6. The method of claim 1, further comprising:
determining whether a device limit has been reached for a maximum number of authenticated communication devices associated with the matched IP address of the trusted mobile communication device; and
upon determining that the device limit has not been reached, proceeding with authentication.

7. The method of claim 6, wherein the device limit is six for the maximum number of authenticated communication devices associated with the matched IP address of the trusted mobile communication device.

8. The method of claim 1, wherein the cookie comprises an embedded electronic serial number or an identifying number associated with the untrusted communication device.

9. The method of claim 1, wherein access to the premium communication service on the untrusted communication device is lost upon expiration of the cookie.

10. The method of claim 1, wherein the premium communication service comprises a video communication service.

11. An authentication server for providing premium communication services via an untrusted network, comprising:
a processor;
a non-transitory memory; and
an application stored in the non-transitory memory that, when executed by the processor, configures the processor to:
receive a request from an untrusted communication device to access a premium communication service via the untrusted network, wherein the request comprises an internet protocol (IP) address of a router; and
authenticate the untrusted communication device for a time period based on a time-to live value included in an earlier authentication for a trusted mobile communication device, the authenticating comprising:
match the IP address of the router from the request with a previously stored source IP address of the router associated with a message received earlier from the trusted mobile communication device, wherein the trusted mobile communication device is authorized to access the premium communication service via the untrusted network;
upon matching the IP address of the router from the request with the previously stored source IP address of the router associated with the message sent by the trusted mobile communication device, obtain a mobile directory number of the trusted mobile communication device;
send a message to the mobile directory number of the trusted mobile communication device via a cellular wireless communication link, wherein the message requests a confirmation from the trusted mobile communication device before proceeding with authentication of the untrusted communication device in accessing the premium communication service;
in response to the confirmation, determine whether the request is received within the time period indicated by the time-to-live value included in the earlier authentication for the trusted mobile communication device;
upon determining that the request is received within the indicated time period, generate a cookie associated with the untrusted communication device;
embed a new time-to-live value associated with premium content access within the cookie, wherein the new time-to-live value indicates a window of time for which extended authentication of the untrusted communication device is valid; and
send the cookie to the untrusted communication device via the untrusted network, wherein the untrusted communication device and the trusted mobile communication device are different devices.

12. The server of claim 11, wherein the trusted mobile communication device is associated with a premium communication service subscription account.

13. The server of claim 11, wherein the premium communication service comprises a video communication service.

14. The server of claim 11, wherein the untrusted network is accessed via a WiFi wireless or wired communication link.

15. The server of claim 11, wherein the trusted mobile communication device is one of a mobile phone, a personal digital assistant, a media player, a tablet computer, a laptop computer, or a notebook computer.

16. The server of claim 11, wherein the cookie comprises an embedded electronic serial number or an identifying number associated with the untrusted communication device.

17. The server of claim 11, wherein access to the premium communication service on the untrusted communication device is lost upon expiration of the cookie.

18. The server of claim 11, wherein the previously assigned time-to-live value associated with authentication extension is assigned by the authentication server or selected by a user associated with the trusted mobile communication device during the prior authentication of the trusted mobile communication device.

19. The server of claim 11, wherein the request further comprises an identifying number or an electronic serial number associated with the untrusted communication device.

\* \* \* \* \*